(12) United States Patent
Borkovic et al.

(10) Patent No.: US 11,748,622 B1
(45) Date of Patent: Sep. 5, 2023

(54) SAVING INTERMEDIATE OUTPUTS OF A NEURAL NETWORK

(71) Applicant: Amazon Technologies, Inc., Seattle, WA (US)

(72) Inventors: Drazen Borkovic, Los Altos, CA (US); Se jong Oh, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1,220 days.

(21) Appl. No.: 16/292,236

(22) Filed: Mar. 4, 2019

(51) Int. Cl.
*G06N 3/082* (2023.01)
*G06F 16/901* (2019.01)
*G06N 3/063* (2023.01)
*G06F 8/41* (2018.01)

(52) U.S. Cl.
CPC ........... *G06N 3/082* (2013.01); *G06F 8/433* (2013.01); *G06F 16/9024* (2019.01); *G06N 3/063* (2013.01)

(58) Field of Classification Search
CPC ...... G06N 3/082; G06F 16/9024; G06F 8/433; G06N 3/063
See application file for complete search history.

(56) References Cited

U.S. PATENT DOCUMENTS

| | | | |
|---|---|---|---|
| 2008/0091881 A1* | 4/2008 | Brittain et al. | G06F 13/1642 711/125 |
| 2018/0136912 A1* | 5/2018 | Venkataramani et al. | G06F 9/44563 |
| 2019/0286973 A1* | 9/2019 | Kovvuri et al. | G06N 3/04 |
| 2020/0042216 A1* | 2/2020 | Zhang | G06N 3/105 |
| 2020/0242189 A1* | 7/2020 | Chatterjee et al. | G06F 9/44 |

OTHER PUBLICATIONS

Guan et al., "FP-DNN: An Automated Framework for Mapping Deep Neural Networks onto FPGAs with RTL-HLS Hybrid Templates, " 2017 IEEE 25th Annual International Symposium on Field-Programmable Custom Computing Machines (FCCM), 2017, pp. 152-159 (Year: 2017).*
Huang et al., "Design and Implementation of Convolutional Neural Network Accelerator with Variable Layer-by-layer Debugging," ICDLT'18, Jun. 27-29, 2018, Chongqing, China (Year: 2018).*
U.S. Appl. No.16/266,915, "Compile-Time Scheduling," Filed Feb. 04, 2019, 71 pages.

* cited by examiner

*Primary Examiner* — Miranda M Huang
*Assistant Examiner* — Yao David Huang
(74) *Attorney, Agent, or Firm* — Kilpatrick Townsend & Stockton LLP

(57) ABSTRACT

A computing system is configured to access intermediate outputs of a neural network by augmenting a data flow graph generated for the neural network. The data flow graph includes a plurality of nodes interconnected by connections, each node representing an operation to be executed by the neural network. To access the intermediate output, the data flow graph is augmented by inserting a node representing an operation that saves the output of a node which produces the intermediate output. The node representing the save operation is inserted while maintaining all existing nodes and connections in the data flow graph, thereby preserving the behavior of the data flow graph. The augmenting can be performed using a compiler that generates the data flow graph from program code.

20 Claims, 11 Drawing Sheets

US 11,748,622 B1

SAVING INTERMEDIATE OUTPUTS OF A NEURAL NETWORK

BACKGROUND

Artificial neural networks (which are referred to herein as neural networks) take inspiration from the mechanics of the operation of the human brain. In a neural network, neurons are represented by nodes and synapses are represented by weighted connections between the nodes. The weights can reflect different responses to input. A neural network can be arranged in layers, where input data to be analyzed is provided to an input layer, and the outputs of each layer provide the inputs to the next layer. The last layer can output a result. The weight values can be determined through training, during which input data with a known result is provided to the neural network.

Neural networks can be implemented using computer processors such as a Central Processing Unit (CPU) to perform computations. Neural networks can also be implemented using special-purpose processors, which can include multiple processing units optimized for parallel, chained computations, and which can perform better than general purpose processors on the same input data, in certain situations.

In addition to obtaining an overall result, users of neural networks may sometimes be interested in an intermediate output that is generated prior to the final output of the neural network. For instance, intermediate outputs can be used for debugging purposes, in order to correct errors in the program code that implements the neural network. In order to access the intermediate outputs, the program code is usually modified and recompiled for execution. Recompiling can be time and resource intensive, especially for larger neural networks. Additionally, modification of the program code can adversely affect the performance of the original program code, in some cases changing the behavior of the neural network in ways that lead to erroneous results.

BRIEF DESCRIPTION OF THE DRAWINGS

Various embodiments in accordance with the present disclosure will be described with reference to the drawings, in which.

DETAILED DESCRIPTION

Figure 1:
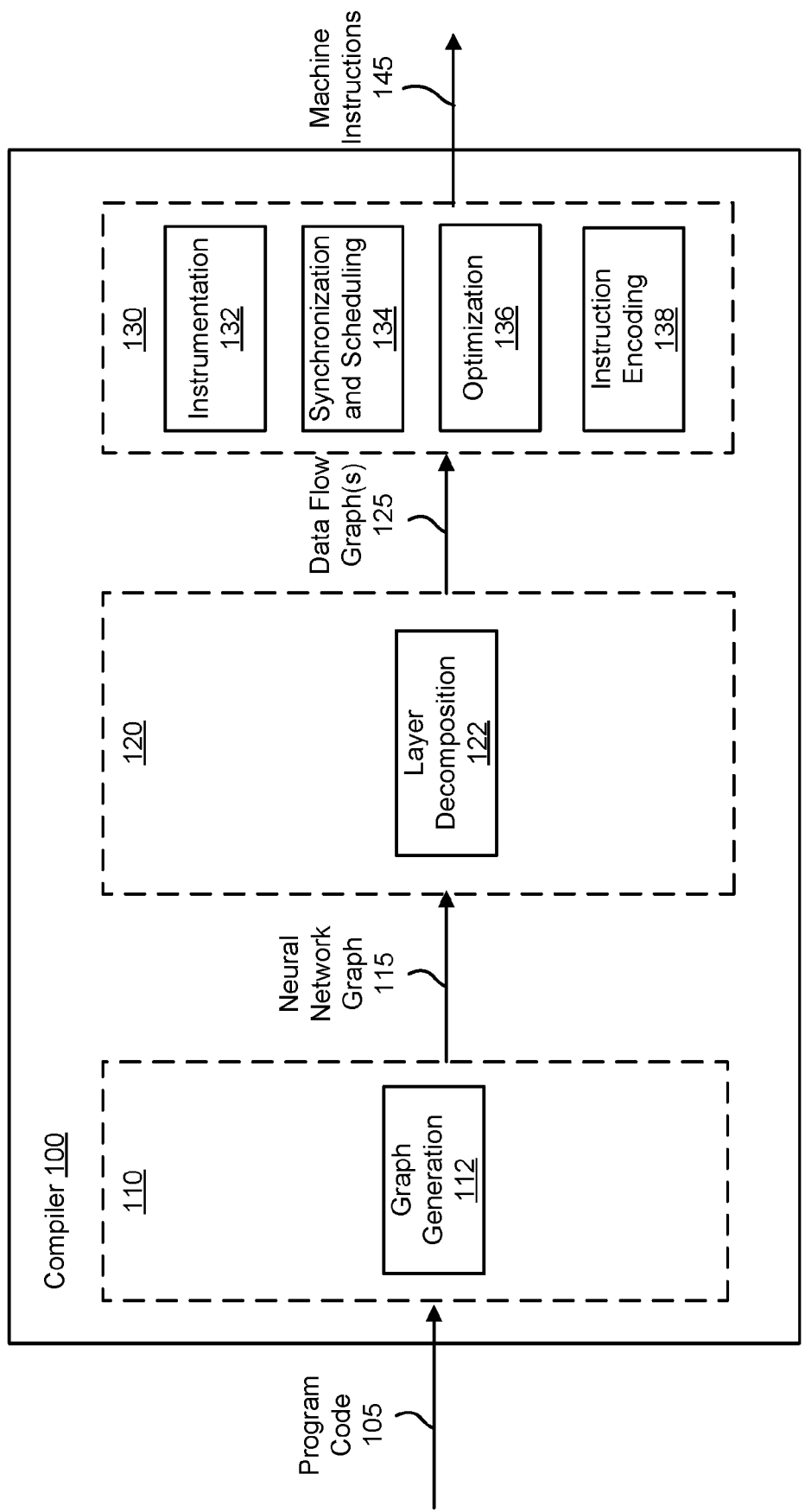
FIG. 1 includes a simplified block diagram of a compiler configured for saving intermediate outputs.

A neural network can be represented as a set of layers, including an input layer, an output layer, and one or more intermediate layers. Each layer executes a computation on the outputs of the previous layer, with the last layer (the output layer) providing a final result. Intermediate layers are often referred to as hidden layers because the outputs of intermediate layers are not usually made available to users. Instead, users generally only see the inputs to the input layer along with the final result. For example, in a computing system comprising a host computer and a neural network processor executing the neural network, the neural network processor may temporarily store intermediate outputs (which are also referred to herein as intermediate results) without transferring such intermediate outputs to the host. An intermediate output can be any result generated prior to the final result of a neural network. For example, an intermediate output can be the output of a hidden layer or some other layer. With more layers, a neural network can, theoretically, perform more complex tasks, such as language translations and distinguishing the contents of one image from another. A neural network with more than three hidden layers is sometimes referred to as a deep neural network. Deep neural networks can have many hidden layers, for example, on the order of a thousand layers. An example of a layered representation of a neural network is described below in connection with FIG. 2.

Neural networks can perform different types of operations to arrive at a final result. For instance, the nodes of a neural network can apply a non-linear function to the weighted sum of the values input into the nodes. Some operations can be implemented using matrices. For example, a convolution operation can involve matrix multiplication and summation. In a pooling operation, the outputs of a cluster of nodes can be combined, for example by finding a maximum value, minimum value, mean value, or median value. Thus, a computing system that executes a neural network can perform convolution, pooling, activation, and/or matrix multiplication, among other things. During execution of the neural network, details of such operations, including any intermediate outputs produced by the operations, are generally not made available. For example, a neural network processor executing a neural network on behalf of a host may only send a final result to the host.

The program code for a neural network is generally written using a high-level programming language (e.g., as source code) that is more readily understandable to a human than the actual machine instructions (e.g., binary code) executed by the computer system. For instance, a software developer creating a neural network may define, using high-level programming language constructs, the structure of the neural network in terms of the organization of each layer, including defining the nodes within each layer and the computations performed by those nodes. The developer may also specify initial weights for connections between nodes, with the weights possibly being subsequently automatically modified in response to training of the neural network.

To convert the program code written by the developer into machine instructions, the program code can be processed through a compiler program. The conversion process can involve decomposing the neural network as represented in the program code into more detailed representations. These detailed representations include computation operations, which the compiler can organize for execution in a manner that ensures correct behavior in accordance with the original program code (e.g., by scheduling the operations and/or placing the operations in a particular order). The conversion process can take into consideration the specific configuration of the target computer system on which the neural network is to be executed. For instance, when scheduling the operations, the compiler may take into consideration what types of processing units or other computing resources (e.g., memory) are available on the target computer system. The compiler can output machine instructions that are executable on the target computing system.

Because intermediate outputs are not usually saved, access to intermediate outputs generally involves modifying the program code to include explicit instructions for saving the intermediate outputs. If the program code is modified retroactively, this can introduce unintended consequences in the behavior of the program code. To avoid modifying the behavior of the program code, various examples described herein involve the introduction of save operations at a later point in the compilation process. In particular, the save operations can be introduced by inserting nodes into a data flow graph, where the data flow graph is generated based on the original program code. After inserting these additional nodes, the data flow graph can be converted into executable machine instructions, in the same manner as would be performed if the data flow graph had not been augmented with additional nodes.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 includes a simplified block diagram of a compiler 100 configured for saving intermediate outputs. As mentioned earlier, there may be times when a user is interested in intermediate outputs, e.g., the output of a hidden layer. A mechanism for saving intermediate outputs can be useful, for instance, during debugging of the program code for the neural network. Debugging can occur at any time during the software development process. Sometimes, the user may choose to perform debugging after noticing erroneous results. Having access to intermediate outputs would enable the user to analyze the behavior of the neural network in greater detail than would otherwise be possible.

The operation of the compiler 100 can be roughly divided into three stages: a front end 110, a middle end 120, and a back end 130. As shown in FIG. 1, each stage includes certain modules, which can be implemented as software modules. The illustration of the various stages and the placement of certain modules in particular stages is purely for purposes of explaining the approximate timing with which certain steps can occur during compilation. In alternative examples, certain steps may be omitted or performed at a different stage than shown in FIG. 1.

Figure 2:
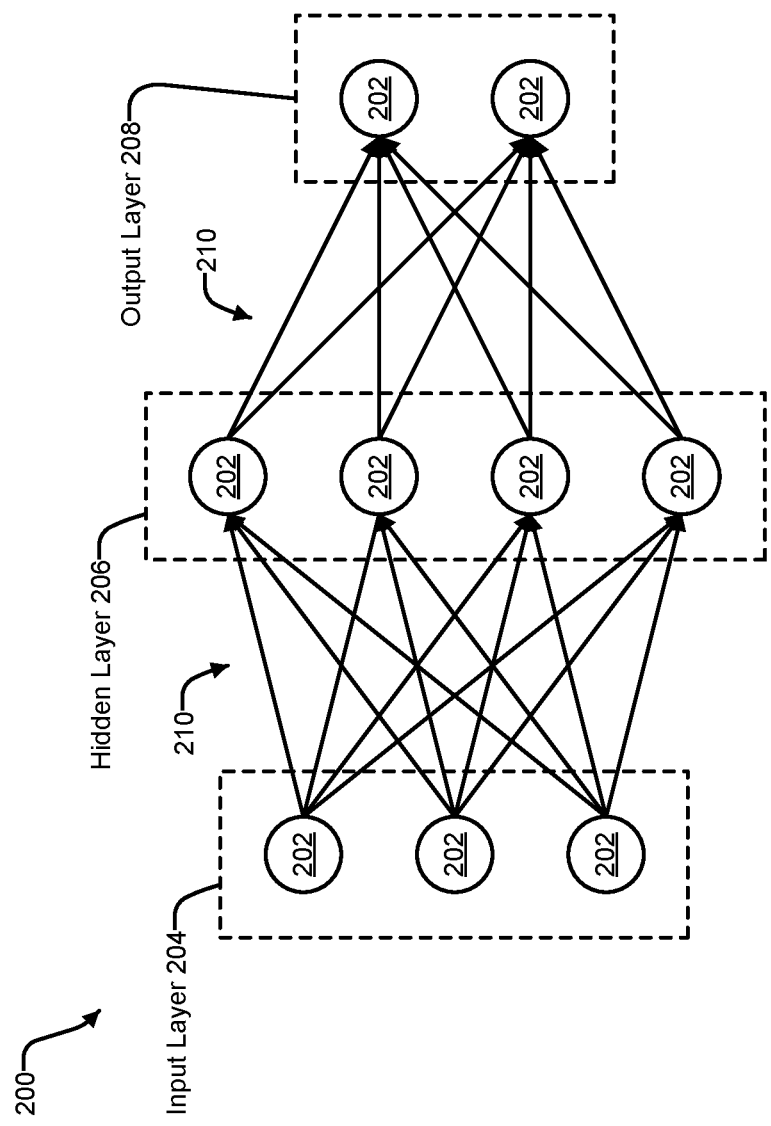
FIG. 2 illustrates an example of a model for a neural network.

The front end 110 accepts program code 105 as input and can generate a neural network graph using a graph generation module 112. The program code 105 is usually written in a high-level programming language such as MATLAB or TensorFlow, and can include definitions for each layer, individual nodes, and connections between nodes, among other things. The neural network graph 115 can be a directed graph with weighted connections between layers. FIG. 2 shows an example of such a graph.

FIG. 2 illustrates an example of a model 200 for a neural network. The model 200 is a graphical representation of the neural network and includes an input layer 204, a hidden layer 206, and an output layer 208. Each layer includes some number of nodes 202. In this example, the nodes 202 of the input layer 204 are connected to each node 202 of the hidden layer 206. The connections, which would be referred to as synapses in the brain model, are referred to as weights 210. Also in this example, each node 202 of the hidden layer 206 has a connection or weight 210 with each node 202 of the output layer. The input layer 204 can receive inputs and can propagate the inputs to the hidden layer 206. A neural network implementation can include multiple hidden layers. Weighted sums computed by the hidden layer 206 (or multiple hidden layers) are propagated to the output layer 208, which can present final outputs to a user. The outputs of the nodes 202 can be referred to as activations, in keeping with the brain model.

An example of a computation that can occur at each layer in the example model 200 is as follows:

$$y_j = f\left(\sum_{i=1}^{3} W_{ij} \times x_i + b\right)$$

In the above equation, $W_{ij}$ is a weight, $x_i$ is an input activation, $y_j$ is an output activation, $f()$ is a non-linear function, and b is a bias term. Various non-linear functions can be used to achieve different purposes.

The model 200 can be referred to as a directed acyclic graph. In a directed graph, each connection to or from a node indicates a direction (e.g., into the node or away from the node). Directed acyclic graphs are directed graphs in which there are no paths from a node back to the same node. Additionally, the model 200 can be referred to as a weighted graph. In a weighted graph, at least some connections have an assigned weight. In FIG. 2, the values of the weights 210 are omitted for simplicity. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

FIG. 2 is merely an example of how a neural network might be represented in graph form. The structure of the graph can change depending on the configuration of the neural network. For example, FIG. 2 is an example of a purely feed-forward neural network. In a feed-forward neural network, the computation is a sequence of operations on the outputs of a previous layer, with the final layer generating the outputs of the neural network. A feed-forward neural network has no memory and the output for a given input can be always the same, irrespective of any previous inputs given to the neural network.

In contrast, recurrent neural networks have an internal memory. In a recurrent neural network, some intermediate operations can generate values that are stored internally and that can be used as inputs to other operations, in conjunction with the processing of later input. For example, the outputs of nodes 202 in the output layer 208 can be connected back to the inputs of the nodes 202 in the output layer 208. Thus, a graph for a recurrent neural network can be cyclical.

Returning to FIG. 1, the middle end 120 can include a layer decomposition module 122. The layer decomposition module 122 operates to decompose the neural network graph 115 into one or more data flow graphs 125. For example, the neural network graph 115 could be converted into an equivalent data flow graph comprising nodes representing operations that collectively provide the functionality of the nodes in the neural network graph 115. One reason why a compiler might decompose a neural network graph is to break the computations into smaller operations that are suitable for parallel execution on multiple processing units such as multiple accelerators of a neural network processor. Without decomposition, the computations may be too large to be performed on a single processor. In addition or as an alternative to generating an overall data flow graph, the compiler 100 may generate separate data flow graphs for each layer of the neural network, e.g., one data flow graph per layer. The data flow graph 125 can be structured in a similar manner to the neural network graph 115, e.g., as a directed graph. Example data flow graphs are described below in connection with FIGS. 3-5.

The back end 130 can include an instrumentation module 132, a synchronization and scheduling module 134, an optimization module 136, and an instruction encoding module 138. The instrumentation module 132 can accept user requests for access to intermediate outputs. For example, a user might request the intermediate output produced by a particular hidden layer or the output of a particular node within a hidden layer. To service this request, the instrumentation module 132 can be configured to augment the data flow graph 125 by adding one or more save operations at a specific location within the data flow graph. Augmentation is described in further detail in connection with FIG. 4.

The synchronization and scheduling module 134 can check for data dependencies between operations in the data flow graph 125. Data dependencies can occur when an operation depends on the result of another operation. For example, an earlier operation might set the value of a variable and a subsequent operation might require the value set by the earlier operation as an input. Such dependencies are sometimes referred to as flow dependencies. Data dependencies can also occur when operations access the same resource (e.g., a particular memory location), even if the operations may not reference the same variables. For example, in a write-after-write scenario, both operations may write different variables to the same memory location. As another example, in a write-after-read scenario, the subsequent operation may write to a memory location that is read by the earlier operation. To ensure program correctness, the synchronization and scheduling module 134 can identify any data dependencies that may exist and, if necessary, modify the sequence of execution to resolve such dependencies. For example, the synchronization and scheduling module 134 may insert one or more independent operations between two operations that are mutually dependent, so that the earlier of the two operations has sufficient time to complete before beginning the subsequent operation.

The synchronization and scheduling module 134 can also schedule the operations by assigning execution of the operations to particular processing units of a target computing system. For example, scheduling may involve assigning operations for parallel execution on different neural network accelerators. The scheduling can take into consideration the identified dependencies. In some instances, the synchronization and scheduling module 134 may enforce dependencies by instructing a processing unit to wait for a first operation to complete before beginning a second operation that is dependent on the result of the first operation.

The optimization module 136 can optimize the data flow graph 125 by, for example, grouping related operations together for execution on the same processing unit or assigning memory resources to operations such that the memory is utilized efficiently. Optimization can also be performed in connection with adding save operations for saving intermediate outputs. An example of this type of optimization is described in connection with FIG. 5.

The instruction encoding module 138 can convert the data flow graph 125 into machine instructions 145. The machine instructions 145 can be output as binary code or some other type of machine code recognized by the target computing system. For example, the instruction encoding module 138 may generate a binary executable file that can be loaded onto a memory of the target computing system.

Figure 3:
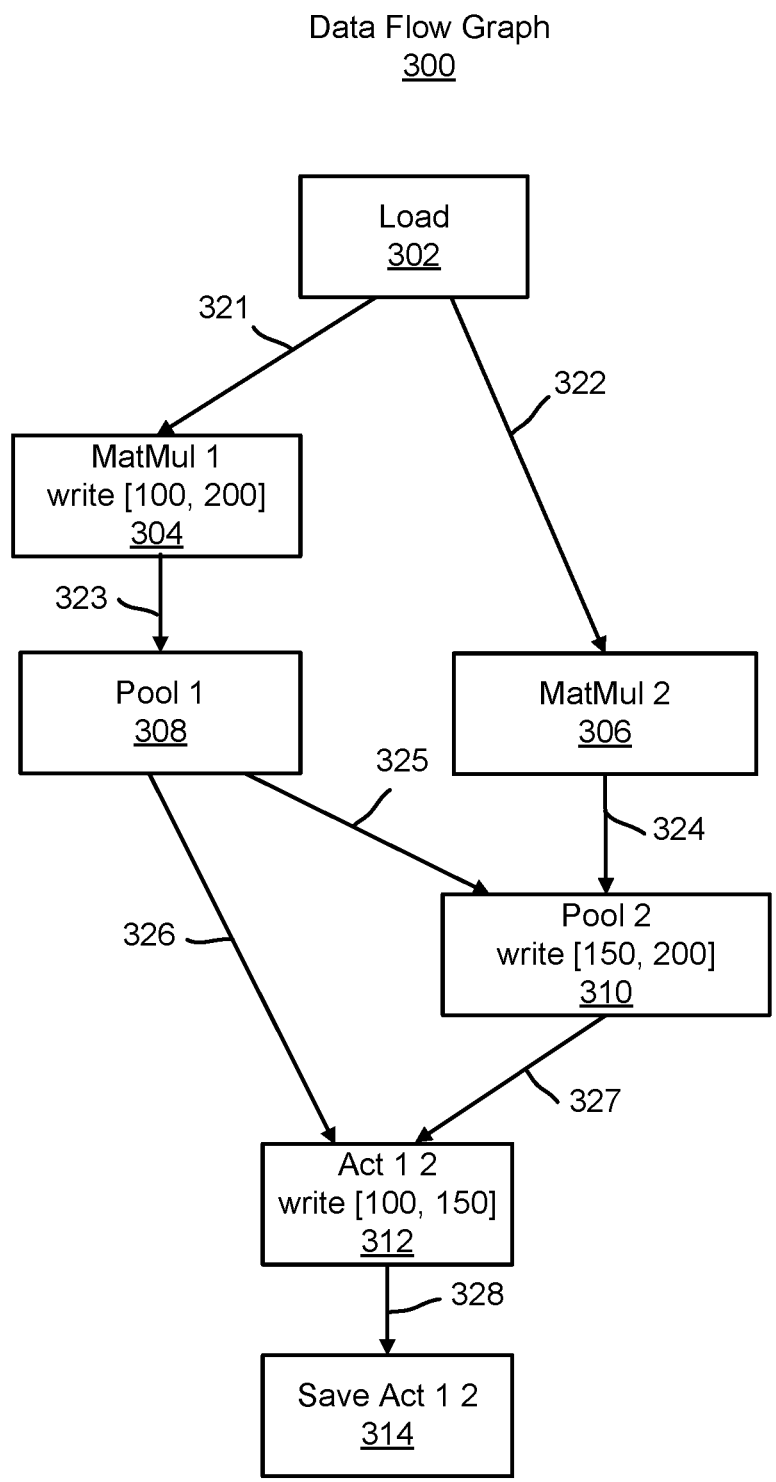
FIG. 3 illustrates an example of a data flow graph for a neural network.

FIG. 3 illustrates an example of a data flow graph 300 for a neural network. A neural network includes nodes that perform certain computations. Analogously, the data flow graph 300 includes nodes that represent operations. The data flow graph 300 is a simplified example for explanatory purposes. In practice, a data flow graph for a neural network would usually be significantly larger. Further, each of the operations in the data flow graph 300 could potentially be decomposed into additional operations. Comparing FIG. 3 to FIG. 2, it can be seen that the overall structure of the data flow graph 300 is similar to that of the model 200. In particular, the data flow graph 300 is a directed (and, in this example, acyclic) graph in which the nodes are connected by a set of edges 321-328.

As illustrated in FIG. 3, the data flow graph 300 includes a node 302 representing a Load operation, a node 304 representing a first matrix multiplication operation (MatMul 1), a node 306 representing a second matrix multiplication operation (MatMul2), a node 308 representing a first pooling operation (Pool 1), a node 310 representing a second pooling operation (Pool 2), a node 312 representing an activation operation (Act 1 2), and a node 314 representing a save operation (Save Act 12) that saves the result of the Act 1 2 operation. Thus, some of the nodes in the data flow graph 300 represent data transfer (e.g., load and save operations), while other nodes represent computation (e.g., matrix multiplication, pooling, and activation).

In the example of FIG. 3, some of the operations can be executed in parallel, while other operations need to be executed in sequence. A first operation might need to be executed after a second operation because, for instance, the first operation uses a result of the second operation, so that there exists a flow dependency between the first operation and the second operation. Here, the Load operation is followed by MatMul 1 and MatMul 2, as indicated by the edges 321 and 322, which connect the node 302 to the nodes 304 and 306, respectively. The edges 321-328 are directional to indicate the data dependencies between the various nodes, and thus the relative sequence of operations between any given pair of nodes that are connected by an edge. MatMul 1 is followed by Pool 1 (as indicated by edge 323), MatMul 2 is followed by Pool 2 (as indicated by edge 324), Pool 1 is followed by both Pool 2 and Act 1 2 (as indicated by edges 325 and 326), Pool 2 is followed by both Act 1 2 (as indicated by edge 327), and Act 1 2 is followed by Save Act 1 2 (as indicated by edge 328). The edges 321-328 may be determined by performing a dependency check at the time of constructing the data flow graph 300, e.g., whenever a memory address is being assigned to an operation.

Details of the operations in FIG. 3 have been omitted for simplicity. However, memory accesses performed by the MatMul 1, Pool 2, and Act 1 2 operations are shown as examples of data dependencies. The illustrated data dependencies are an example of a write-after-write dependency. MatMul 1 includes a write to memory address range [100, 200]. Pool 2 includes a write to memory address range [150, 200]. Act 1 2 includes a write to memory address range [100, 150]. Thus, the memory addresses used by MatMul 1, Pool 2, and Act 1 2 overlap. In this example, the dependencies between these three operations could be resolved in various ways including, for example, changing the addresses assigned to one or more of these operations. For example, the compiler may have initially assigned the addresses as shown in FIG. 3 for purposes of memory efficiency, but can modify the memory assignments to resolve dependencies, possibly trading off some efficiency as a result. Another way to handle the dependencies would be through synchronization.

Figure 4:
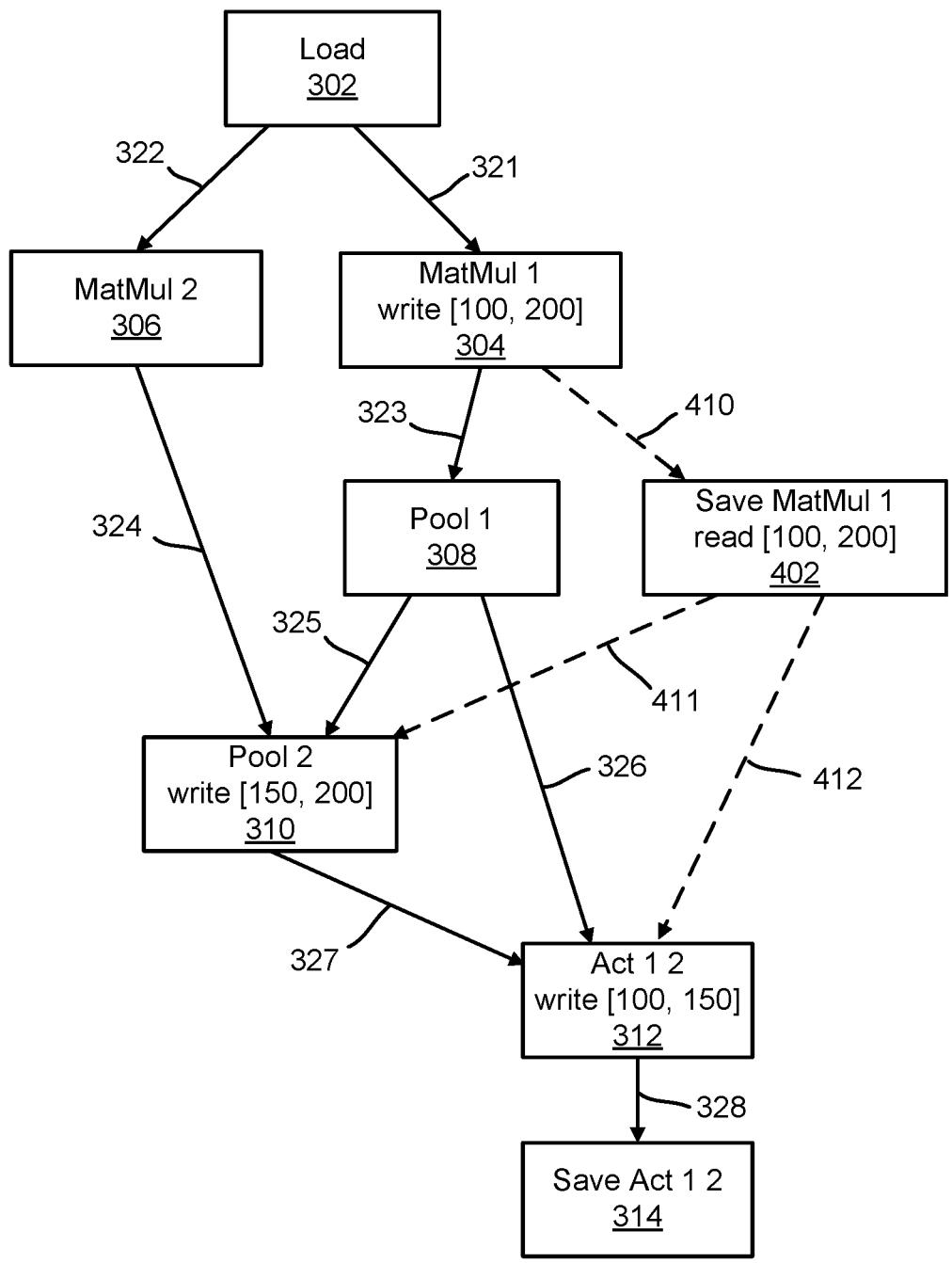
FIG. 4 illustrates the data flow graph of FIG. 3 augmented to include a save operation.

FIG. 4 illustrates an example of a data flow graph 400 corresponding to the data flow graph 300 of FIG. 3 augmented to include a save operation (Save MatMul 1). The save operation could be added based on a determination, by the compiler, that the intermediate output requested by the user is an output of MatMul 1. Assuming that the compiler has access to the data flow graph 300, the compiler can insert a node 402 representing Save MatMul 1 after the node 304. In this example, the node 402 has been inserted between MatMul 1 and Act 1 2. The compiler may have access to the data flow graph 300 because the data flow graph 300 could have been generated during a previous compilation of the program code. Thus, the compiler may have saved information about which data flow graph nodes produce the intermediate output of interest.

Augmenting a data flow graph has certain advantages over other techniques for saving intermediate outputs. It should be noted that save operations generally cannot be introduced at the level of the neural network graph (e.g., neural network graph 115 in FIG. 1) because the neural network graph does not usually include any address information for the data that a layer consumes or produces. Instead, the addresses are generally assigned later by the compiler, e.g., as part of converting the neural network graph to a data flow graph. Thus, save operations could be added at the data flow graph level, either during the process of generating the data flow graph (e.g., during an initial compilation of the program code) or, as in this example, after the data flow graph has already been generated (e.g., as a post-processing procedure performed after the program code has been compiled).

Although it may be possible to generate a data flow graph by compiling program code that includes explicit instructions for saving intermediate outputs and transferring those intermediate outputs to a host or other computing system, such an approach has several disadvantages. The code for generating the data flow graph and the code for generating additional nodes for saving intermediate outputs are tightly coupled. Consequently, introducing saves during regular compilation could result in a more complex and less robust implementation of the neural network. In some cases, the behavior of the neural network could be changed in a way that produces erroneous results. This could happen, for instance, if additional dependencies created as a result of adding code for saving intermediate outputs are not taken into consideration. Further, the manner in which saves are implemented may change based on the compilation tool used. The code for saving intermediate outputs may need to be adapted for the specific compiler.

The augmented data flow graph approach illustrated in FIG. 4 can be generated during a separate compilation step after having previously compiled the program code. Alternatively, augmentation can be performed in the later stages of compilation, after the data flow graph has already been generated. In either case, the program code that produced the original data flow graph (e.g., data flow graph 300) does not need to be modified in order to implement save operations. In general, nodes that represent save operations should satisfy two conditions. First, the save node should follow the node whose output it saves. This is because there is an inherent flow dependency between the save node and the node being saved. In this example, Save MatMul 1 follows MatMul 1. Second, the save node should precede any node that could potentially overwrite the memory location saved/read by the save operation.

To meet the first condition, the compiler can create an edge from the node being saved to the save node. In FIG. 4, this corresponds to creating an edge 410 from node 304 to node 402. In this example, Save MatMul 1 has to follow MatMul 1, but in general can be executed in parallel with other operations. For example, the Save MatMul 1 operation can be executed in parallel with Pool 1 and MatMul 2.

To meet the second condition, the compiler can detect all nodes that could potentially overwrite the memory location that is read by the save operation and create an additional edge between the save node and each node that writes to the memory location read by the save operation. This detection can be performed by checking for data dependencies between the save operation and other operations in the data flow graph. In particular, the compiler can check for write-after-read dependencies, since the save operation involves reading data that could potentially be overwritten by a subsequent write operation. The additional edges represent such dependencies. In FIG. 4, these additional edges include an edge 411 from node 402 to node 310 and an edge 412 from node 402 to node 312. This is because Act 1 2 and Pool 2 write to the same memory location that Save MatMul 1 reads.

In general, data dependence analysis can be readily performed in a compiler since the compiler usually has access to memory access information for individual nodes in the data flow graph. Such memory access information can include, for example, compile-time strides and counts. In the context of an array (e.g., a two-dimensional matrix), stride refers to the size of the memory locations used between the beginning of one array element and the beginning of the next array element. For example, each row of a matrix can be stored in a separate row of memory, where the memory row is at least as large as the size of the matrix row. In some instances, the memory row may exceed the size of the matrix row, in which case the data of the matrix may be stored in non-contiguous memory locations. Thus, the memory access information can be used to determine, for any particular node, the exact memory locations that are accessed by the node.

The creation of the edges 410-412 ensures that the correct data is read by the Save MatMul 1 operation and essentially flags potential dependencies to enable the compiler to handle such dependencies during synchronization. However, as explained in connection with FIG. 5, not every dependency flagged in this manner needs to be addressed because the dependency may be handled in some other way.

Figure 5:
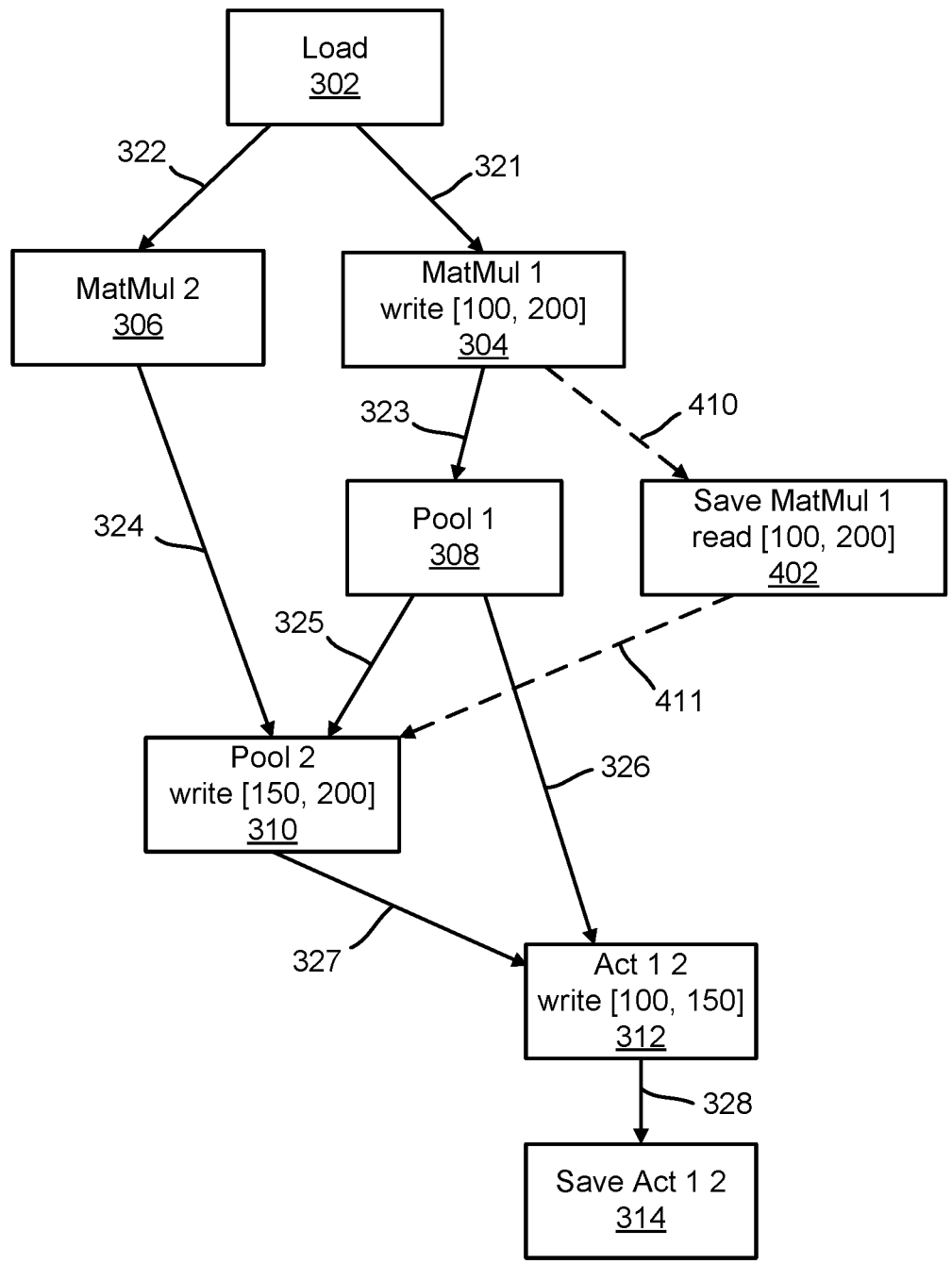
FIG. 5 illustrates an example optimized version of the data flow graph in FIG. 4.

FIG. 5 illustrates a data flow graph 500 corresponding to an optimized version of the data flow graph 400 in FIG. 4. The data flow graph 500 can be generated during an optional optimization step in which redundant edges are removed. In this example, the data flow graph 500 has been generated by removing the edge 412 from FIG. 4. As used herein, edge redundancy refers to the situation in which the data dependence between the edge's start and end nodes is already enforced by some other path in the augmented data flow graph, making enforcement via the edge unnecessary. In FIG. 4, the edge 412 is redundant because, assuming that Pool 1 completes after Save MatMul 1, the data dependence between node 402 and node 312 is already enforced by the path connecting MatMul 1, Pool 1, and Act 1 2, i.e., the path comprising node 304, edge 323, node 308, edge 326, and node 312. Edge redundancy can be detected using data race detection algorithms. In this example, data race detection can be applied to determine whether or not Pool 1 completes after Save MatMul 1 and, if so, then the edge 412 can be removed without impacting program correctness.

The examples of FIGS. 4 and 5 illustrate one of the advantages of data flow graph augmentation. Specifically, the augmentation (and the optional optimization that follows the augmentation) does not remove any of the edges from the original data flow graph, e.g., the data flow graph 300 in FIG. 3. Consequently, any existing non-redundant dependencies are retained, thereby ensuring that the behavior of the original data flow graph is not modified. Following augmentation, and possibly optimization, the data flow graph can be converted to machine instructions in the same manner as would be performed for a non-augmented data flow graph.

The examples of FIGS. 4 and 5 are simplified examples to illustrate processing steps that can be performed for a single save operation. In practice, an intermediate output can be produced by multiple data flow graph nodes. For example, the intermediate output of a layer can be produced by multiple nodes of that layer. Further, a layer node can, in some instances, be decomposed into multiple data flow graph nodes such that saving the output of the layer node would require saving the outputs of each of the multiple data flow graph nodes. To save these outputs, additional save operations can be implemented in the same manner as described above with respect to the save operation represented by node 402.

Additionally, further enhancements or optimizations can be performed in the context of multiple save operations. For example, in some implementations, the compiler can be configured to recognize that the intermediate output is produced by two or more operations that write results to consecutive memory locations. In such instances, the compiler may choose to create a single save operation for reading across the consecutive memory locations rather than creating separate save operations. Thus, save nodes can, in some instances, be combined to maximize memory performance.

Figure 6:
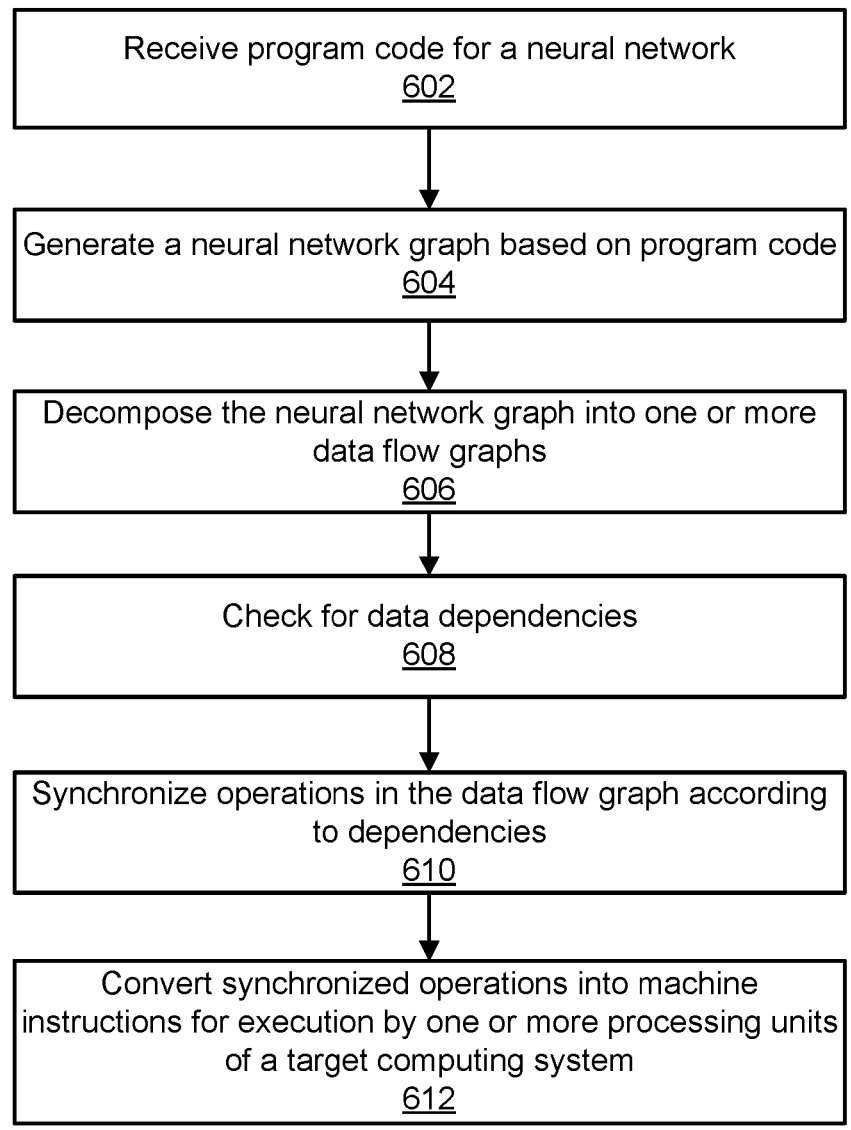
FIG. 6 is a flow diagram of an example process for compiling program code for a neural network.

FIG. 6 is a flow diagram of an example process 600 for compiling program code for a neural network. The process 600 can be performed by a compiler (e.g., the compiler 100 in FIG. 1) or, more generally, by a computing device that processes compiled code, and includes an overview of steps for converting program code for a neural network into machine instructions that are executable on a computing system. Further, some or all of the process 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium can be non-transitory.

At step 602, the compiler receives program code for the neural network. The program code may be received as a single file or multiple files, for example, a source code file together with a set of library files. The program code is generally written in a high-level programming language and can include definitions for the various elements of the neural network. For instance, in an object-oriented programming language, different classes of objects may be defined to instantiate the input layer, one or more hidden layers, and an output layer, as well as the nodes within each layer.

At step 604, the compiler generates a neural network graph based on the program code. The neural network graph corresponds to a model of the neural network at the layer level and includes representations of the connections (e.g., directional edges) between the various nodes and the weights assigned to the edges, if any. The model 200 in FIG. 2 is an example of a visual representation of a neural network graph.

At step 606, the compiler decomposes the neural network graph into one or more data flow graphs. The data flow graph can provide a more detailed view of the computations performed by the neural network and can include nodes and edges, in analogous manner to a neural network graph. Because the individual nodes of a data flow graph generally correspond to operations that make up a portion of the overall computations performed by the nodes of a neural network, the data flow graph representation may be less easily understandable to a human user. However, the data flow graph may be useful as an intermediate step in the process of generating machine instructions and can assist the compiler in determining how to allocate computing resources for executing the computations. The data flow graph 300 in FIG. 3 is an example of a data flow graph that could be generated through decomposition of a neural network graph.

At step 608, the compiler checks for data dependencies. Step 608 can be performed after assigning memory resources to the operations in the data flow graph. In some instances, the assigning of memory resources occurs in conjunction with generating the data flow graph, e.g., steps 606 and 608 can be combined. The data flow graph can include, for each node, information indicating what memory resources (e.g., individual addresses or address ranges) are used for the operation represented by the node. The compiler may use the dependencies to determine which operations can execute in parallel and which operations have to be executed in sequence.

At step 610, the compiler synchronizes the operations in the data flow graph according to the dependencies identified in step 608. In some implementations, step 610 can insert synchronization instructions for a target computing system. For instance, the compiler may have access to information on the configuration of the target computing system. The compiler can therefore assign operations to specific processing units (e.g., a processor core or execution engine) of the target computing system. As part of assigning the operations, the compiler can specify, using a synchronization instruction, that a specific processing unit should wait for the result of a first operation to complete before beginning execution of a second operation that is dependent on the result of the earlier operation. The first operation and second operation could be executed on the same or different processing units. In some implementations, the compiler may delegate synchronization to the target computing system. For example, the target computing system may include synchronization circuitry (e.g., implementing semaphores, queues, or another type of synchronization primitive) that can be used to handle dependencies.

At step 612, the compiler converts the synchronized operations into machine instructions for execution by one or more processing units of the target computing system. As mentioned earlier, machine instructions can be formatted as binary code that is loadable onto a memory of a target computing system. If the target computing system has multiple processing units (e.g., multiple instances of the accelerator in FIG. 8 below), the compiler may generate a separate set of instructions for each processing unit. The compiler may be configured to save the machine instructions, for example in a local memory of a computing system in which the compiler is running. If the compiler runs on a separate system from the target computing system, the compiler can transfer the machine instructions to the target computing system, for example, over a network.

Figure 7:
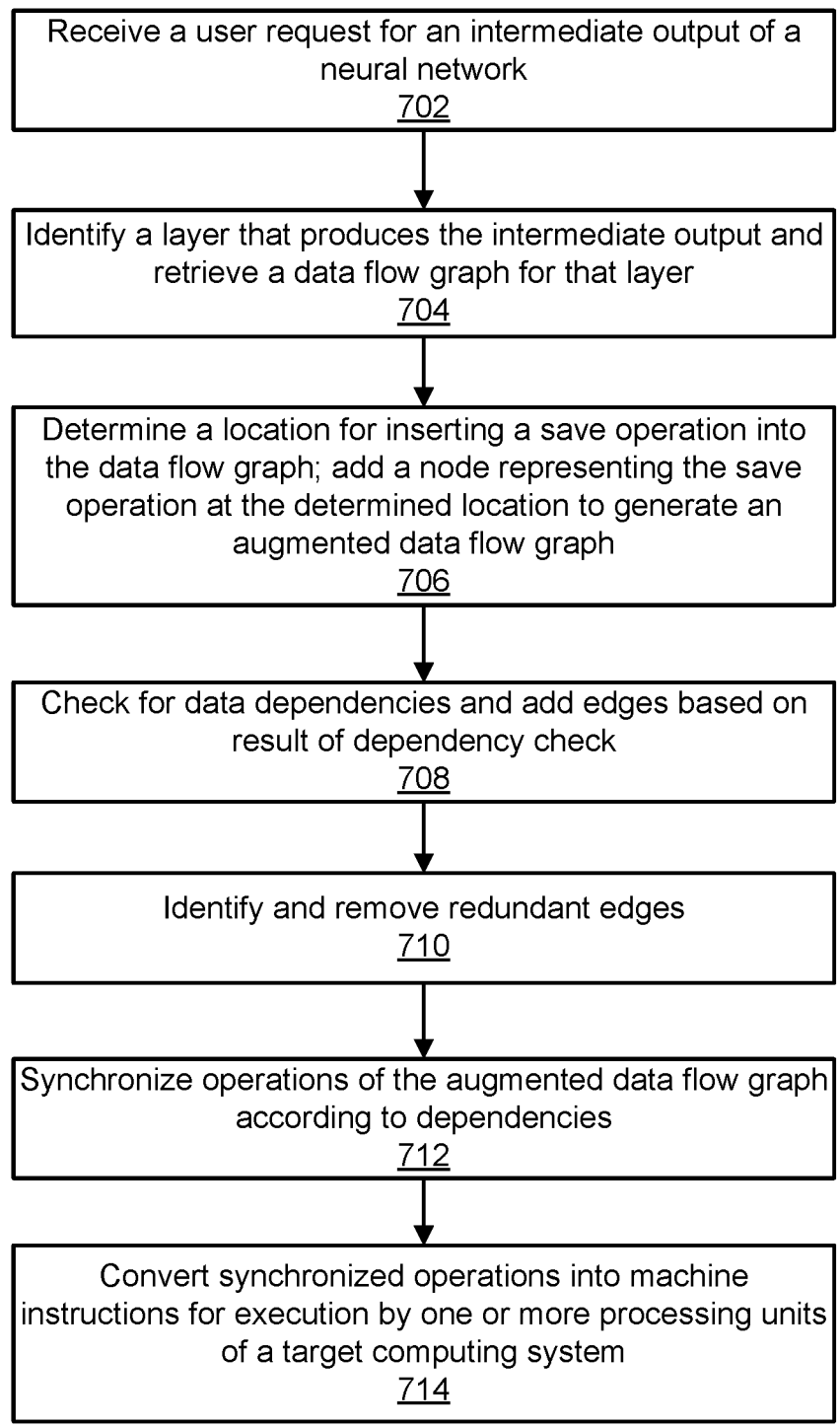
FIG. 7 is a flow diagram of an example process for modifying a data flow graph to access intermediate outputs of a neural network.

FIG. 7 is a flow diagram of an example process 700 for modifying a data flow graph to access intermediate outputs of a neural network. The process 700 can be performed by a compiler (e.g., the compiler 100 in FIG. 1). In general, the process 700 can be performed any time after a data flow graph has been produced as a result of compiling program code for a neural network.

At step 702, the compiler receives a user request for an intermediate output of the neural network. The user request can, in some implementations, be submitted through a graphical user interface provided by the compiler. In the context of process 700, the user may be an end-user who is interested in intermediate outputs produced by the neural network in response to a particular set of inputs. Alternatively, the user may be a software developer who is interested in learning more about the behavior of the neural network, e.g., for debugging purposes. As one example, the software developer may have noticed unexpected results after applying a set of data (e.g., training data) as input to the neural network. To determine why the neural network produced such results, the software developer can request access to the intermediate outputs produced, for example, by a particular layer (e.g., a hidden layer) or a particular node within the layer. Another example of when a user request for intermediate outputs might occur is in connection with refining the operation of the neural network. For instance, the user may be interested in determining whether a hidden layer produces results that are adequate such that execution of the neural network all the way through the final layer is unnecessary.

The user request received in step 702 can identify the intermediate output with various levels of specificity. For instance, an end user might only have access to a layered representation of the neural network (e.g., neural network graph 200 in FIG. 2). As such, the end user could request the intermediate output produced by a particular layer or by a particular node within the layer. In contrast, a software developer may have access to additional data not available to end users, such as data flow graphs (e.g., data flow graph 300 in FIG. 3). Accordingly, the software developer could request, as the intermediate output, an output of a particular node in a data flow graph. The user request therefore does not need to specify a layer in every instance, but can instead identify the source of the intermediate output from any number of representations of the neural network that may be available to the compiler. Further, a user request can identify multiple intermediate outputs to be saved. For example, the user request could specify multiple layers, or multiple nodes in a neural network graph or data flow graph.

At step 704, the compiler identifies a layer that produces the intermediate output requested by the user and retrieves a data flow graph for that layer. In some instances, the intermediate output may be produced by nodes that are spread across multiple data flow graphs, in which case the compiler may obtain more than one data flow graph. For simplicity, the discussion of process 700 assumes that only one data flow graph is relevant and, further, that only one node produces the requested intermediate output. The data flow graph may be obtained from a local memory or other memory accessible to the compiler. In some instances, the data flow graph may have been stored in the memory in connection with an earlier compilation that proceeded through completion.

At step 706, the compiler determines a location for inserting a save operation into the data flow graph and adds, at the determined location, a node representing the save operation to generate an augmented data flow graph (e.g., the data flow graph 400 in FIG. 4). As explained earlier in connection with FIG. 4, one of the conditions that should be satisfied is that the node representing the save operation follows the node whose output it saves. Thus, determining the location for inserting the save operation can involve identifying which nodes produce the requested intermediate output, if such nodes have not been explicitly identified by the user, and selecting an appropriate location for the save operation. The selected location can be any location that follows the node whose output is being saved. In the example of FIG. 4, the node 402 representing the Save MatMul 1 operation immediately follows the node 304 representing the MatMul 1 operation. However, the save operation can also occur later in the data flow chart.

The save operation can save the intermediate output to a particular memory location, The memory location can be in the same memory space used by the other operations in the data flow graph, or in a separate memory space reserved for storing results of save operations. For example, in FIG. 4, the compiler could configure the Save MatMul 1 operation to include a sub-operation of writing the results of read [100, 200] to an address range [300, 400], where the address range [300, 400] is within an address range [300, 800] that has been reserved for storing results of save operations. The memory location can be automatically selected by the compiler, e.g., based on which memory addresses are available. In some embodiments, the user may be provided with an option to manually specify where the intermediate output is saved to.

At step 708, the compiler checks for data dependencies and adds edges based on a result of the dependency check. The check in step 708 can be performed in the same manner as the dependency check in step 608 of FIG. 6, except that the check is now applied to the augmented data flow graph instead of the original data flow graph. The check in step 708 will therefore identify any additional data dependencies that may have been introduced as a result of augmenting the data flow graph to include the save operation. For each data dependency involving the save node (e.g., node 402), the compiler can create an edge between the save node and the node with which the save node is dependent.

In some implementations, steps 706 and 708 can be combined such that the location to insert the save operation is selected to satisfy the two conditions described earlier. That is, in addition to selecting the location of the save node as a location following the node being saved, the location of the save node can be selected to be a location that precedes any node that writes to a memory location read by the save node, with the existence of any nodes that write to the memory location read by the save node being indicated by the result of the dependency check.

At step 710, the compiler identifies and removes any redundant edges. The identification of redundant edges can be performed in the manner described above in connection with FIG. 5. As mentioned in the discussion of FIG. 5, edge redundancy refers to the situation in which the data dependence between the edge's start and end nodes is already enforced by some other path in the augmented data flow graph, making enforcement via the edge unnecessary. Therefore, step 710 can involve identifying all possible paths that lead from the node whose output is being saved (e.g., node 304) and determining, for each edge connected to the save node (e.g., node 402), whether the data dependence between the save node and another node to which the edge is connected (e.g., node 328 as depicted in FIG. 4) is enforced by at least one of the identified paths. Steps 704-710 can be repeated if the user request in step 702 is for multiple intermediate outputs, or in response to a subsequent user request for an intermediate output.

At step 712, the compiler synchronizes the operations of the augmented data flow graph according to the dependencies identified in step 708. Step 712 can be performed in the same manner as in step 610 of FIG. 6.

At step 714, the compiler converts the synchronized operations into machine instructions for execution by one or more processing units of the target computing system. Step 714 can be performed in the same manner as in step 612 of FIG. 6. After execution of the machine instructions, the output of the neural network (i.e., one or more final results) can be made available for access together with the saved intermediate output(s). For example, in FIG. 10, the saved outputs may be sent from the neural network processor 1060 to the host processor 1072. In some embodiments, the intermediate output may be saved in memory for subsequent reading upon a request from the host processor or other computing device. Additionally, in some embodiments, intermediate outputs may be output as soon as the intermediate outputs are saved, e.g., before a final result has been computed.

Figure 8:
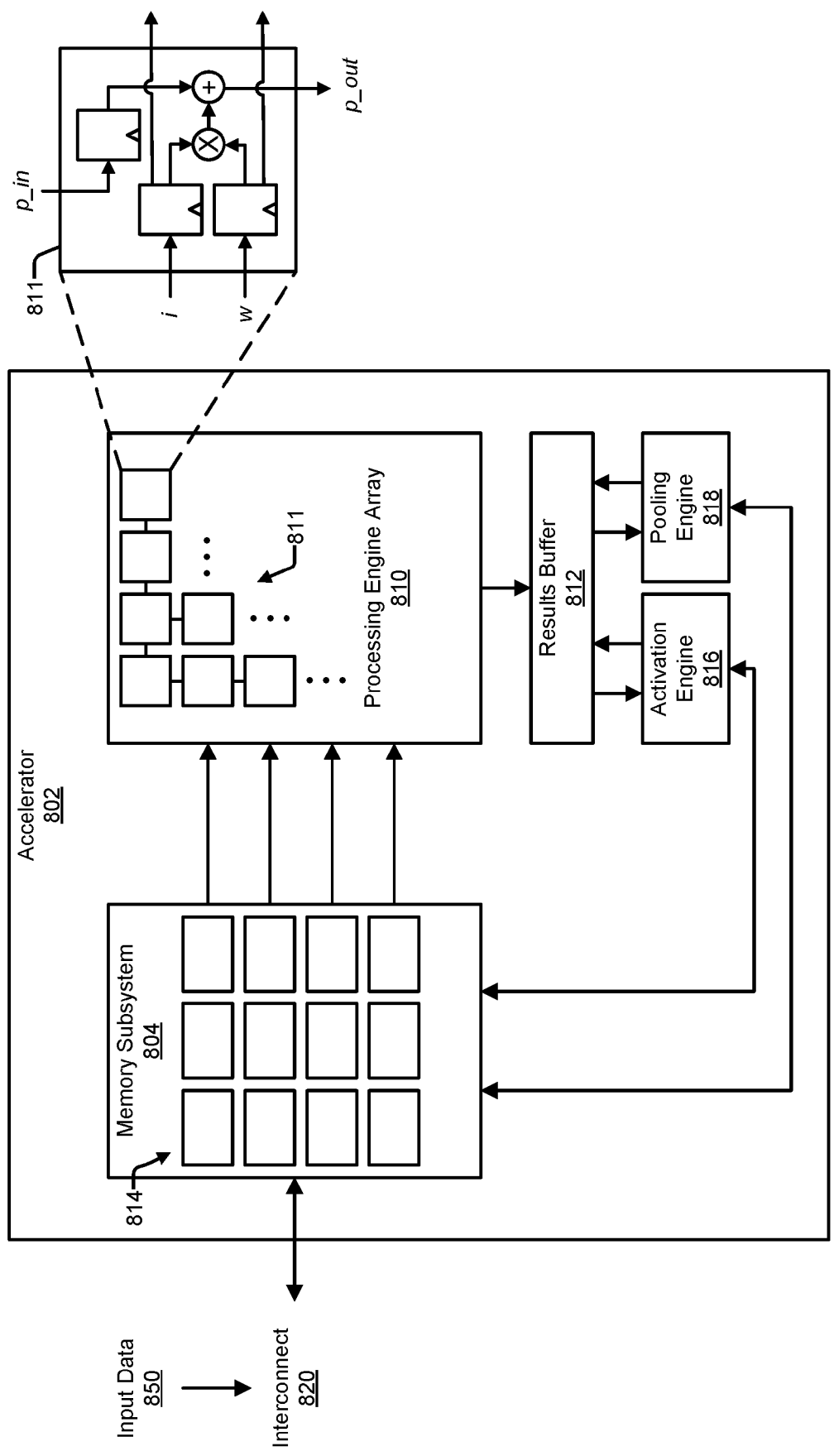
FIG. 8 illustrates an example of an accelerator that can be used to execute a neural network.

FIG. 8 is a block diagram illustrating an example accelerator 802 that can be used to execute a neural network. The accelerator 802 includes multiple execution engines that can have data inter-dependencies. In various examples, the accelerator 802, for a set of input data (e.g., input data 850), can execute computations using a processing engine array 810, an activation engine 816, and/or a pooling engine 818. In some examples, the accelerator 802 may be an integrated circuit component of a processor, such as a neural network processor. The processor may have other integrated circuit components, including additional accelerators.

In various implementations, the memory subsystem 804 can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over an interconnect 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hardwired to receive values from columns of the processing engine array 810, with one memory bank receiving data for each column.

The processing engine array 810 is the computation matrix of the accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the interconnect 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operate on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the interconnect 820. The interconnect 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

To implement a neural network processing engine, the accelerator 802 can, for a set of input data 850, execute a neural network to perform a task for which the neural network was trained. Executing a neural network on a set of input data can be referred to as inference or performing inference. The weights for the neural network can be stored in the memory subsystem 804, along with the input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then copied out to a host processor memory or to another location.

Figure 9:
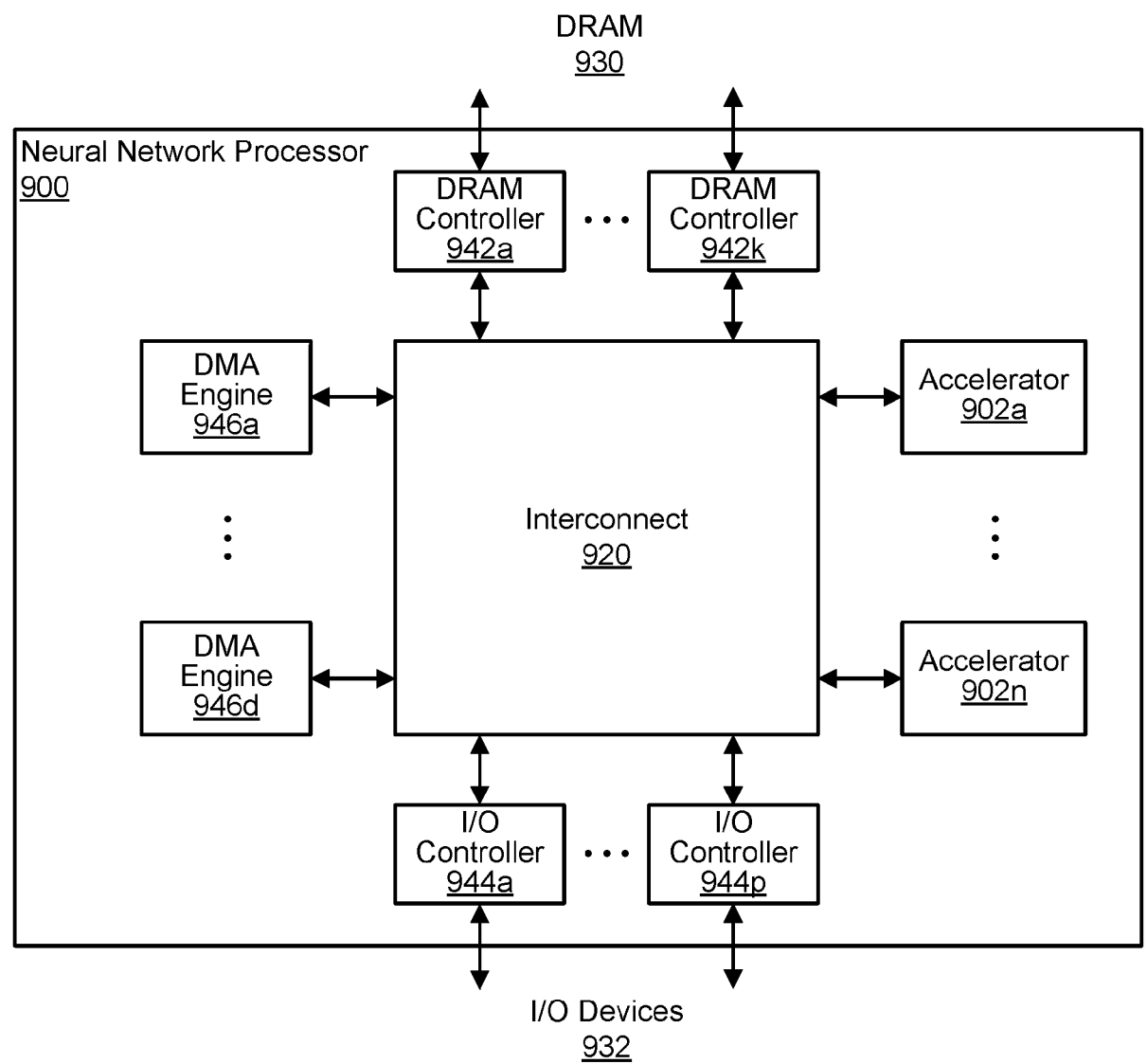
FIG. 9 illustrates an example of a neural network processor that has multiple accelerators.

In various implementations, the accelerator 802 discussed above can be part of a neural network processor. FIG. 9 illustrates an example of a neural network processor 900 that has multiple accelerators 902a-902n. Each of the accelerators 902a-902n can include a memory subsystem and processing engine array, and can execute the computation required for a neural network to perform a task for which the neural network was programmed. In the illustrated example, the neural network processor 900 includes n accelerators 902a-902n.

The neural network processor 900 further includes DRAM controllers 942a-942k for communicating with processor memory, implemented in this example using DRAM 930. In the illustrated example, the neural network processor 900 includes k DRAM controllers 942a-942k, each of which may be able to communicate with an independent set of banks of DRAM. In other examples, other types of RAM technology can be used for the processor memory. The DRAM controllers 942a-942k can also be referred to as memory controllers.

The example neural network processor 900 further includes I/O controllers 944a-944p for communicating with I/O devices 932 in the system. The neural network processor 900 can communicate with I/O devices over, for example, a processor bus. In some examples, the processor bus can be implemented using Peripheral Component Interconnect (PCI) and/or a variation of the PCI bus protocol. The processor bus can connect the neural network processor 900 to I/O devices 932 such as, for example, input and output devices, memory controllers, storage devices, and/or network interface cards, among other things. In this example, the neural network processor 900 includes p I/O controllers 944a-944p, each of which may include a separate root complex and may communicate with a separate set of I/O devices 932. In other examples, other standardized bus protocols, such as Ultra Path Interconnect (UPI), can be used for the host bus. In other examples, a proprietary bus protocol can be used.

The example neural network processor 900 further includes DMA engines 946a-946d that can move data between the accelerators 902a-902n, DRAM controllers 942a-942k, and I/O controllers 944a-944p. In the illustrated example, the neural network processor 900 includes d DMA engines 946a-946d. In some implementations, the DMA engines 946a-946d can be assigned to specific tasks, such as moving data from the DRAM controllers 942a-942k to the accelerators 902a-902n, or moving data between the I/O controllers 944a-944p and the accelerators 902a-902n. In some implementations, at least one DMA engine 946a-946d can be dedicated to each accelerator 902a-902n. In some implementations, the DMA engines 946a-946d can be treated as a pool instead of being dedicated to a function or component, such that whenever data needs to be moved, an available DMA engine 946a-946d is engaged.

In the example neural network processor 900, the various components can communicate over an interconnect 920, which may correspond to the interconnect 820 in FIG. 8. The interconnect 920 primarily includes wiring for routing data between the components of the neural network processor 900. In some cases, the interconnect 920 can include a minimal amount of logic, such as multiplexors to control the direction of data, flip-flops for handling clock domain crossings, and timing logic.

In some examples, each of the accelerators 902a-902n can simultaneously be executing a different neural network. In some examples, two or more of the accelerators 902a-902n can execute the same neural network for different inputs. In some examples, two or more of the accelerators 902a-902n can be executing parts of the same neural network (e.g., parts of the same layer or different layers). In some examples, two or more of the accelerators 902a-902n can sequentially execute layers of a neural network, such that inputs can be pipelined through the accelerators.

Figure 10:
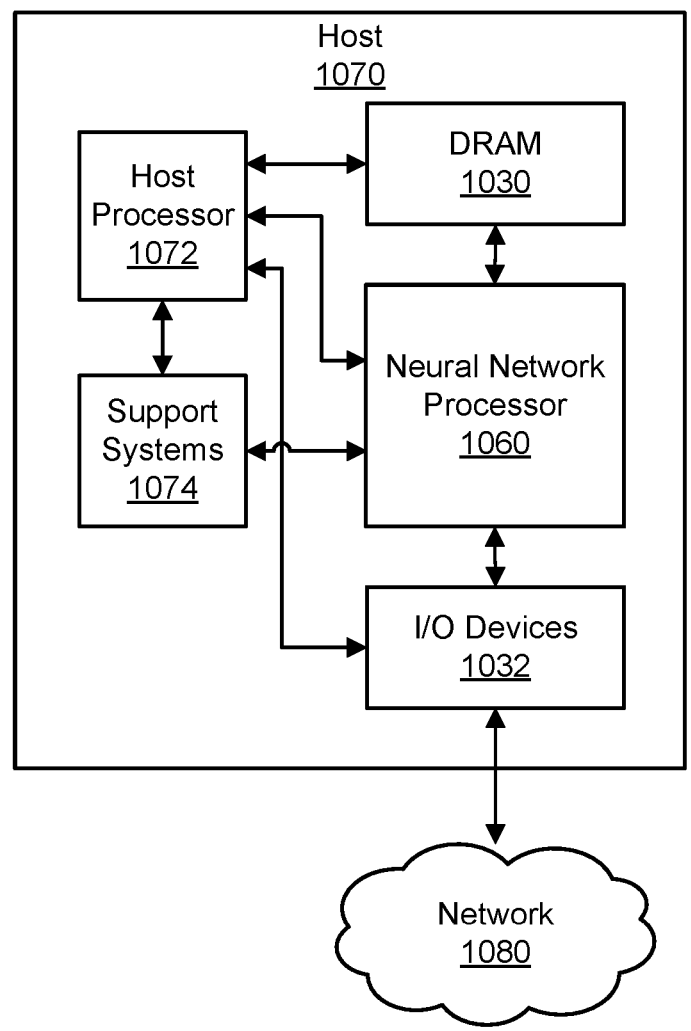
FIG. 10 illustrates an example of a host system in which a neural network processor can be used.

FIG. 10 illustrates an example of a host system 1070 in which a neural network processor 1060 can be used. The example host system 1070 includes the neural network processor 1060, a host processor 1072, DRAM 1030 or processor memory, I/O devices 1032, and support systems 1074. In various implementations, the host system 1070 can include other hardware that is not illustrated here.

The host processor 1072 is a general purpose integrated circuit that is capable of executing program instructions. In some examples, the host processor 1072 can include multiple processing cores. In some examples, the host system 1070 can include more than one host processor 1072. In some examples, the host processor 1072 and the neural network processor 1060 can be one chip, such as one or more integrated circuits within the same package.

In some examples, software programs executing on the host processor 1072 can receive or generate input for processing by the neural network processor 1060. In some examples, the programs can select an appropriate neural network to execute for a given input. For example, a program may be for language translation, and can select one or more neural networks capable of speech recognition and/or machine translation. In these and other examples, the programs can configure the neural network processor 1060 with the neural network to execute, and/or can select a neural network processing engine on the neural network processor 1060 that has previously been configured to execute the desired neural network. In some examples, once the neural network processor 1060 has started inference on input data, the host processor 1072 can manage the movement of data (such as weights, instructions, intermediate results, results of conditional layers, and/or final results) into or out of the neural network processor 1060.

The DRAM 1030 is memory that is used by the host processor 1072 for storage of program code that the host processor 1072 is in the process of executing, as well as values that are being operated on. The program code can be stored in the DRAM as machine instructions that were previously generated by a compiler (e.g., the compiler 100 in FIG. 1). In some examples, the data for a neural network (e.g., weight values, instructions, and other data) can be all or partially stored in the DRAM 1030. In some examples, the DRAM 1030 stores a compiler (e.g., the compiler 100 of FIG. 1) configured to generate the program code for the host processor 1072 as machine instructions that are executable by the host processor 1072 and/or the neural network processor 1060. DRAM is a common term for processor memory, and though DRAM is volatile memory, processor memory can be volatile and/or non-volatile.

The I/O devices 1032 can include hardware for connecting to user input and output devices, such as keyboards, monitors, and printers, among other devices. The I/O devices 1032 can also include storage drives and/or network interfaces for connecting to a network 1080. For example, the host system 1070 can use a network interface to communicate with storage devices, user terminals, other computing devices or servers, and/or other networks, among various examples.

In various implementations, the support systems 1074 can include hardware for coordinating the operations of the neural network processor 1060. For example, the support systems 1074 can include a microprocessor that coordinates the activities of the neural network processor 1060, including moving data around on the neural network processor 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 1072. In some examples, the program executed by the microprocessor is stored on the hardware of the microprocessor, or on a non-volatile memory chip in the host system 1070. In some examples, the microprocessor and the neural network processor 1060 can be one chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the neural network processor 1060 to execute the neural network on the set of input data. In some examples, the support systems 1074 only needs to select an appropriate neural network processing engine of the neural network processor. In some examples, the support systems 1074 may need to load the data for the neural network onto the neural network processor 1060 before the neural network processor 1060 can start executing the neural network. In these and other examples, the support systems 1074 can further receive the output of the neural network, and provide the output back to the host processor 1072.

In some examples, the operations of the support systems 1074 can be handled by the host processor 1072. In these examples, the support systems 1074 may not be needed and can be omitted from the host system 1070.

Figure 11:
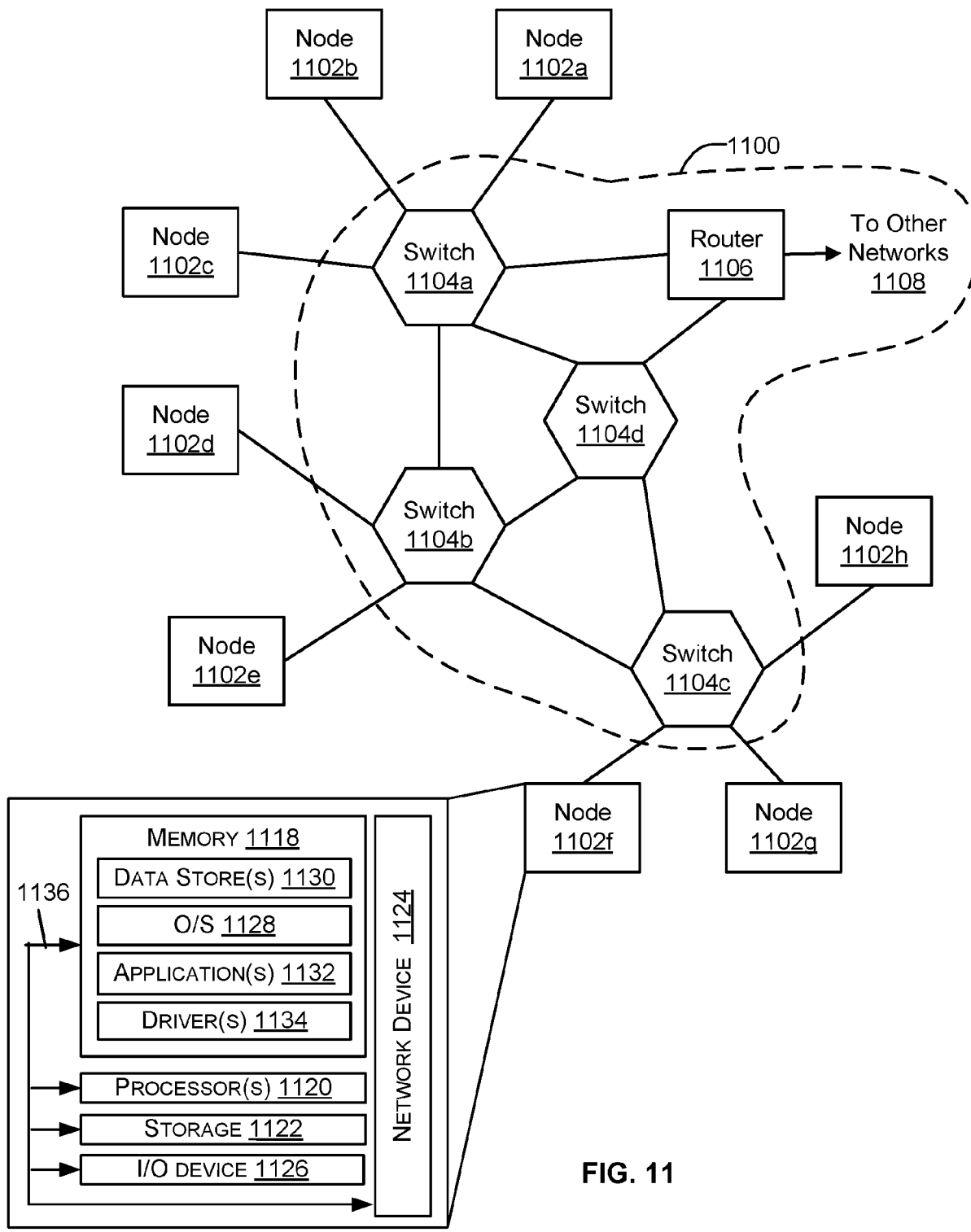
FIG. 11 illustrates an example architecture for features and systems described herein that includes one or more service provider computers and/or a user device connected via one or more networks, according to certain aspects of the disclosure.

FIG. 11 includes a diagram of an example network 1100, which can include one or more host systems, such as the host system illustrated in FIG. 10. For example, the example network 1100 of FIG. 11 includes multiple nodes 1102a-1102h, one or more of which can be a host system such as the host system 1070 in FIG. 10. Others of the nodes 1102a-1102h can be other computing devices, each of which includes at least a memory for storing program instructions, a processor for executing the instructions, and a network interface for connecting to the network 1100.

In various examples, the network 1100 can be used to process data. For example, input data can be received at one of the nodes 1102a-1102h or from other networks 1108 with which the network 1100 can communicate. In this example, the input data can be directed to a node in the network 1100 that includes an acceleration engine (e.g., the accelerator 802 in FIG. 8), for the acceleration engine to operate on and produce a result. The result can then be transferred to the node or other network from which the input data was received. In various examples, input data can be accumulated from various sources, including one or more of the nodes 1102a-1102h and/or computing devices located in the other networks 1108, and the accumulated input data can be directed to one or more host systems in the network 1100. Results from the host systems can then be distributed back to the sources from which the input data was gathered.

In various examples, one or more of the nodes 1102a-1102h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 11, the nodes 1102a-1102h are connected to one another using a switched architecture with point-to point links. The switched architecture includes multiple switches 1104a-1104d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1104a-1104d of FIG. 11 may be connected to the nodes 1102a-1102h and provide multiple paths between any two nodes.

The network 1100 may also include one or more network devices for connection with other networks 1108, such as a router 1106. Routers use headers and forwarding tables to determine the best path for forwarding the packets, and use protocols such as internet control message protocol (ICMP) to communicate with each other and configure the best route between any two devices. The router 1106 of FIG. 11 can be used to connect to other networks 1108 such as subnets, LANs, wide area networks (WANs), and/or the Internet.

In some examples, network 1100 may include any one or a combination of many different types of networks, such as cable networks, the Internet, wireless networks, cellular networks and other private and/or public networks. The interconnected switches 1104a-1104d and the router 1106, if present, may be referred to as a switch fabric 1110, a fabric, a network fabric, or simply a network. In the context of a computer network, terms "fabric" and "network" may be used interchangeably herein.

The nodes 1102a-1102h may be any combination of host systems, processor nodes, storage subsystems, and I/O chassis that represent user devices, service provider computers or third party computers.

User devices may include computing devices to access an application 1132 (e.g., a web browser or mobile device application). In some aspects, the application 1132 may be hosted, managed, and/or provided by a computing resources service or service provider. The application 1132 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s) may communicate with one or more third party computers.

In one example configuration, the node(s) 1102a-1102h may include at least one memory 1118 and one or more processing units (or processor(s) 1120). The processor(s) 1120 may be implemented in hardware, computer-executable instructions, firmware, or combinations thereof. Computer-executable instructions or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102a-1102h, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein. In some examples, the application programs 1132 may include a compiler such as the compiler 100 in FIG. 1, where the compiler generates machine instructions for executing a neural network on one or more of the nodes 1102a-1102h.

The operating system 1128 may support the basic functions of nodes 1102a-1102h, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102a-1102h or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1124 that allow the node(s) 1102a-1102h to communicate with a stored database, another computing device or server, user terminals and/or other devices on the network(s) 1100.

In some implementations, the network device 1124 is a peripheral device, such as a PCI-based device. In these implementations, the network device 1124 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1124 may be connected to a computing system using a PCIe interface.

A PCI-based device may include one or more functions. A "function" describes operations that may be provided by the network device 1124. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1124 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. For instance, as mentioned earlier, the various modules of the compiler 100 in FIG. 1 can be implemented as software modules. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner illustrated in the drawings and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:
    receiving, by a compiler executing on a computing device, a request for access to an intermediate output of a neural network, the request identifying a particular layer of the neural network that produces the intermediate output;
    retrieving, by the compiler, a data flow graph for the particular layer, the data flow graph comprising a plurality of nodes, each node representing an operation of the neural network to be executed by an integrated circuit device, wherein the nodes are interconnected by connections indicating a sequence in which the operations represented by the nodes are to be executed;
    determining, by the compiler, that the intermediate output corresponds to an output of a first node of the plurality of nodes;
    determining, by the compiler, a location to insert an additional node into the data flow graph, wherein the additional node represents a save operation that saves the output of the first node;
    augmenting, by the compiler, the data flow graph, the augmenting comprising, while maintaining existing nodes and connections in the data flow graph:
        inserting the additional node at the determined location;
        creating a first connection from the first node to the additional node;
        creating a second connection from the additional node to a second node of the plurality of nodes based on a result of a dependency check, the second connection representing a data dependency between the save operation and a second operation represented by the second node;
        creating a third connection from the additional node to a third node of the plurality of nodes based on the result of the dependency check, the third connection representing a data dependency between the save operation and a third operation represented by the third node; and
        removing the second connection from the augmented data flow graph based on the determining that the second connection is redundant; and
    converting, by the compiler, the augmented data flow graph into machine instructions executable by the integrated circuit device.

2. The computer-implemented method of claim 1, further comprising:
    performing, by the compiler, a data dependency check on the data flow graph, wherein the second connection and the third connection are created based on a result of the dependency check.

3. The computer-implemented method of claim 2, further comprising:
    identifying, by the compiler, a path in the augmented data flow graph that enforces the data dependency between the save operation and the second operation without going through the second connection; and
    determining, by the compiler, that the second connection is redundant based on the identifying of the path.

4. The computer-implemented method of claim 2, wherein the data dependency is a write-after-read dependency involving a memory location that is read by the save operation and written to by the second operation.

5. A computer-implemented method, comprising:
    receiving, at a computing device, a request for access to an intermediate output of a neural network;
    retrieving, by the computing device, a data flow graph, the data flow graph comprising a plurality of nodes that are interconnected by connections, each node representing an operation of the neural network to be executed by an integrated circuit device, wherein the intermediate output corresponds to an output of a first node of the plurality of nodes;
    determining, by the computing device, a location to insert an additional node into the data flow graph, wherein the additional node represents a save operation that saves the output of the first node; and
    augmenting, by the computing device, the data flow graph, the augmenting comprising, while maintaining existing nodes and connections in the data flow graph:
        inserting the additional node at the determined location;
        creating a second connection from the additional node to a second node of the plurality of nodes based on a result of a dependency check, the second connection representing a data dependency between the save operation and a second operation represented by the second node;
        creating a third connection from the additional node to a third node of the plurality of nodes based on the result of the dependency check, the third connection representing a data dependency between the save operation and a third operation represented by the third node; and removing the second connection from the augmented data flow graph based on the determining that the second connection is redundant; and generating instructions for the integrated circuit device according to the augmented data flow graph.

6. The computer-implemented method of claim 5, further comprising:

performing, by the computing device, a data dependency check on the data flow graph, wherein the second connection and the third connection are created based on a result of the dependency check.

7. The computer-implemented method of claim 6, further comprising:

identifying, by the computing device, a path in the augmented data flow graph that enforces a data dependency between the save operation and the second operation without going through the second connection; and determining, by the computing device, that the second connection is redundant based on the identifying of the path.

8. The computer-implemented method of claim 6, wherein the save operation reads from a memory location, and wherein the second operation and the third operation access the same memory location.

9. The computer-implemented method of claim 6, further comprising:

synchronizing execution of operations represented in the augmented data flow graph, based on dependencies represented by the connections.

10. The computer-implemented method of claim 5, wherein the determining of the location to insert the additional node comprises:

determining, by the computing device, that the intermediate output is produced by the first node; and selecting, as the determined location, a location that follows the first node.

11. The computer-implemented method of claim 5, wherein the determining of the location to insert the additional node comprises:

determining, by the computing device, that the intermediate output is produced by the first node;

determining, by the computing device, that the first node writes the intermediate output to a memory location that is potentially overwritten by a fourth node of the plurality of nodes; and selecting, as the determined location, a location that precedes the fourth node.

12. The computer-implemented method of claim 5, further comprising:

determining, by the computing device, that the intermediate output is produced by the first node and a fourth node of the plurality of nodes;

determining, by the computing device, that the first node and the fourth node output to consecutive memory locations; and based on the determining that the first node and the fourth node output to consecutive memory locations, configuring the save operation as a single operation that saves the outputs of the first node and the fourth node.

13. The computer-implemented method of claim 5, wherein the data flow graph is generated by compiling program code for the neural network prior to receiving the request for access to the intermediate output.

14. A non-transitory computer-readable medium having stored thereon instructions that, when executed by one or more processors, cause the one or more processors to perform processing including:

receiving a request for access to an intermediate output of a neural network;

retrieving a data flow graph, the data flow graph comprising a plurality of nodes that are interconnected by connections, each node representing an operation to be executed by the neural network, wherein the intermediate output corresponds to an output of a first node of the plurality of nodes;

determining a location to insert an additional node into the data flow graph, wherein the additional node represents a save operation that saves the output of the first node;

augmenting the data flow graph, the augmenting comprising, while maintaining existing nodes and connections in the data flow graph:

inserting the additional node at the determined location;

creating a second connection from the additional node to a second node of the plurality of nodes based on a result of a dependency check, the second connection representing a data dependency between the save operation and a second operation represented by the second node;

creating a third connection from the additional node to a third node of the plurality of nodes based on the result of the dependency check, the third connection representing a data dependency between the save operation and a third operation represented by the third node; and removing the second connection from the augmented data flow graph based on the determining that the second connection is redundant; and generating executable instructions according to the augmented data flow graph.

15. The non-transitory computer-readable medium of claim 14, wherein the instructions, when executed by the one or more processors, further cause the one or more processors to perform processing including:

performing a data dependency check on the data flow graph, wherein the second connection and the third connection are created based on a result of the dependency check.

16. The non-transitory computer-readable medium of claim 15, wherein the instructions, when executed by the one or more processors, further cause the one or more processors to perform processing including:

identifying a path in the augmented data flow graph that enforces a data dependency between the save operation and the second operation without going through the second connection; and determining that the second connection is redundant based on the identifying of the path.

17. The non-transitory computer-readable medium of claim 14, wherein the instructions, when executed by the one or more processors, further cause the one or more processors to perform processing including:

generating the data flow graph prior to receiving the request for access to the intermediate output, wherein the generating of the data flow graph comprises:

receiving program code for the neural network;

generating a neural network graph based on the program code, wherein the neural network graph includes a representation of each layer in the neural network; and decomposing the neural network graph into one or more data flow graphs including the data flow graph that is retrieved and augmented.

18. The non-transitory computer-readable medium of claim 14, wherein the instructions, when executed by the one or more processors, further cause the one or more processors to perform processing including:

synchronizing operations represented in the augmented data flow graph for execution, wherein the synchronizing takes into consideration data dependencies represented by the connections.

19. The non-transitory computer-readable medium of claim 14, wherein the instructions cause the one or more processors to determine the location to insert the additional node by:
- determining that the intermediate output is produced by the first node;
- determining that the first node writes the intermediate output to a memory location that is potentially overwritten by a fourth node of the plurality of nodes; and
- selecting, as the determined location, a location that follows the first node and precedes the fourth node.

20. The non-transitory computer-readable medium of claim 14, wherein the instructions, when executed by the one or more processors, further cause the one or more processors to perform processing including:
- determining that the intermediate output is produced by the first node and a fourth node of the plurality of nodes;
- determining that the first node and the fourth node output to consecutive memory locations; and
- based on the determining that the first node and the fourth node output to consecutive memory locations, configuring the save operation as a single operation that saves the outputs of the first node and the fourth node.

* * * * *